United States Patent Office 3,327,523
Patented June 27, 1967

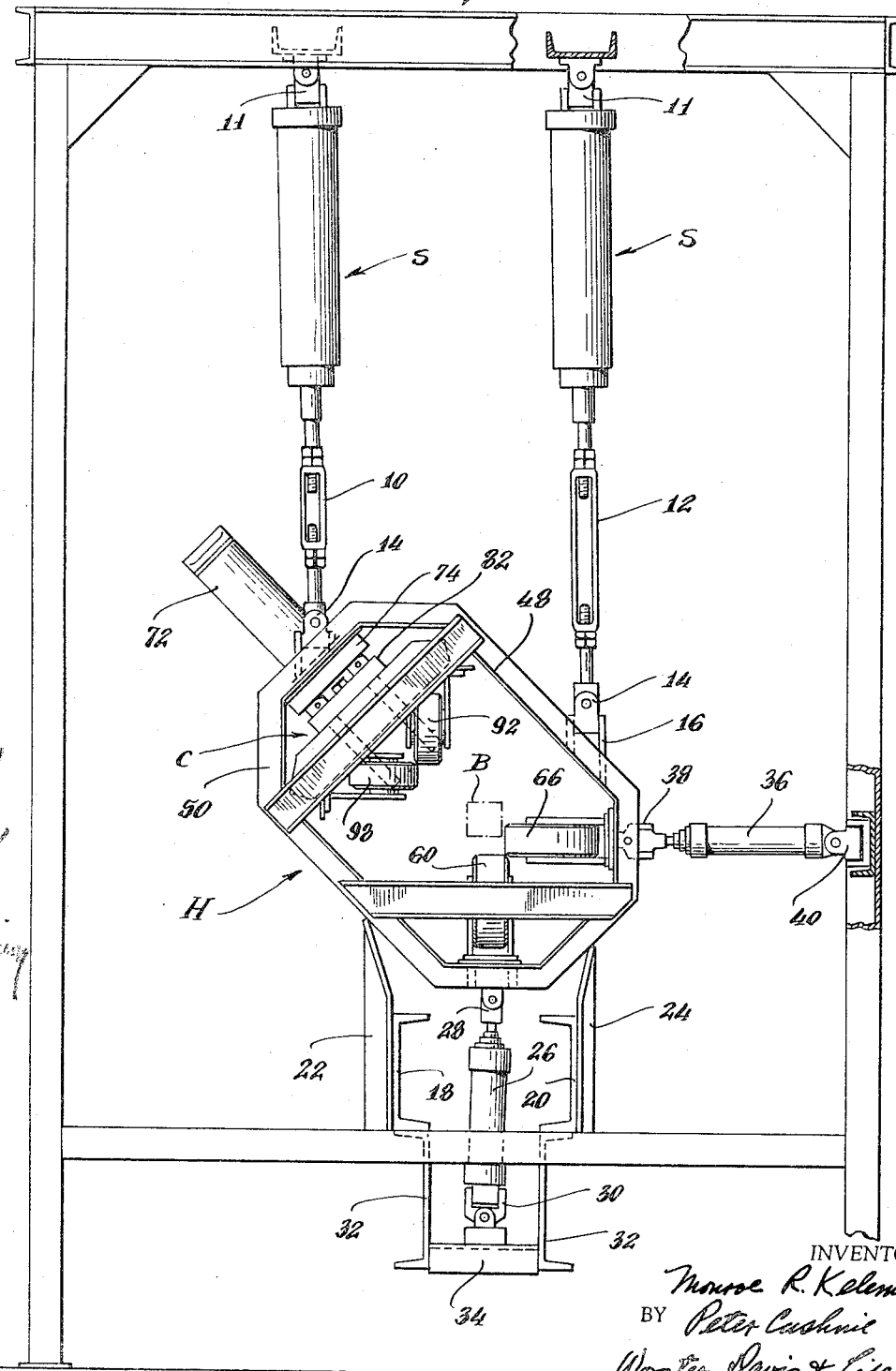

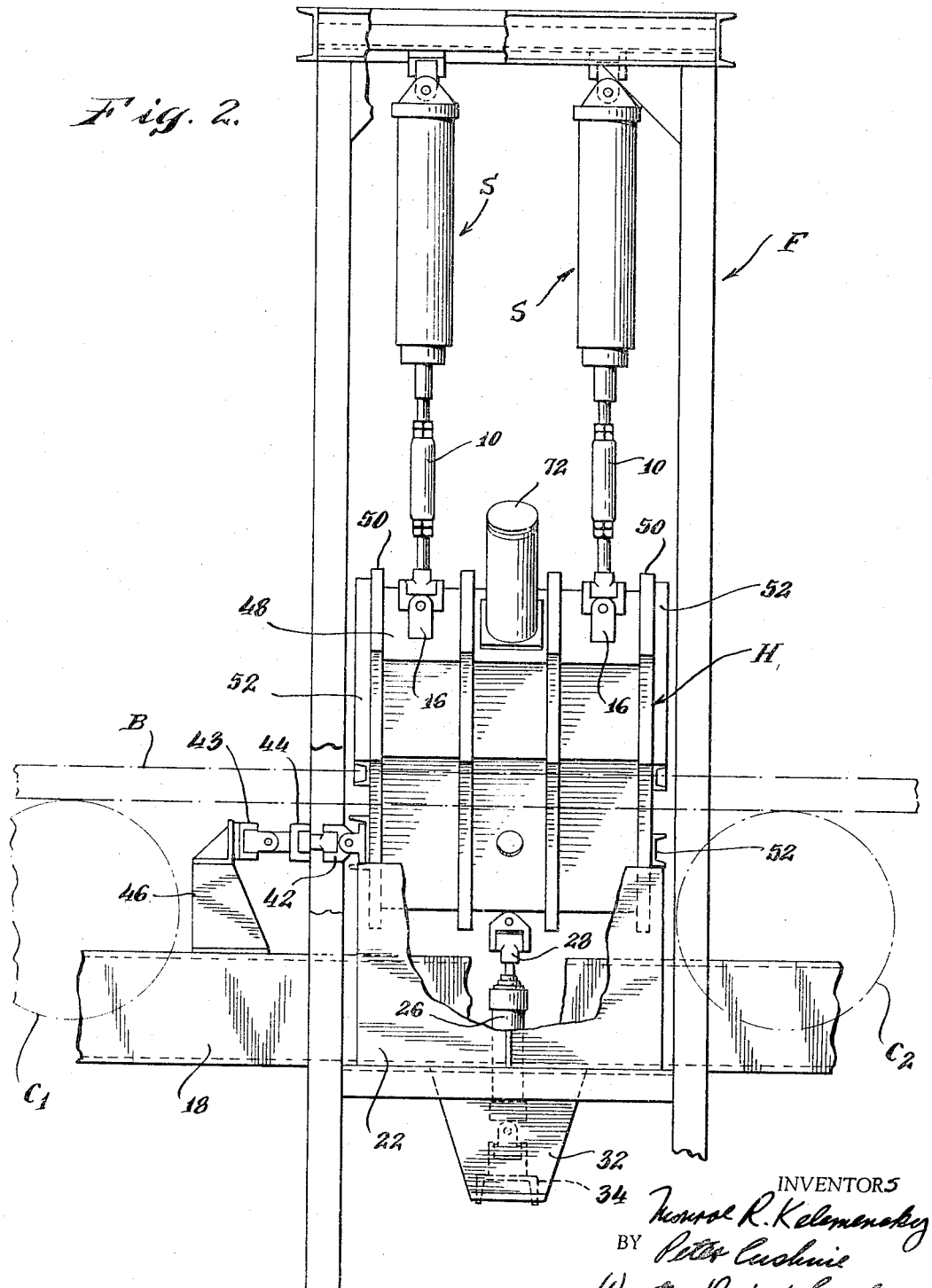

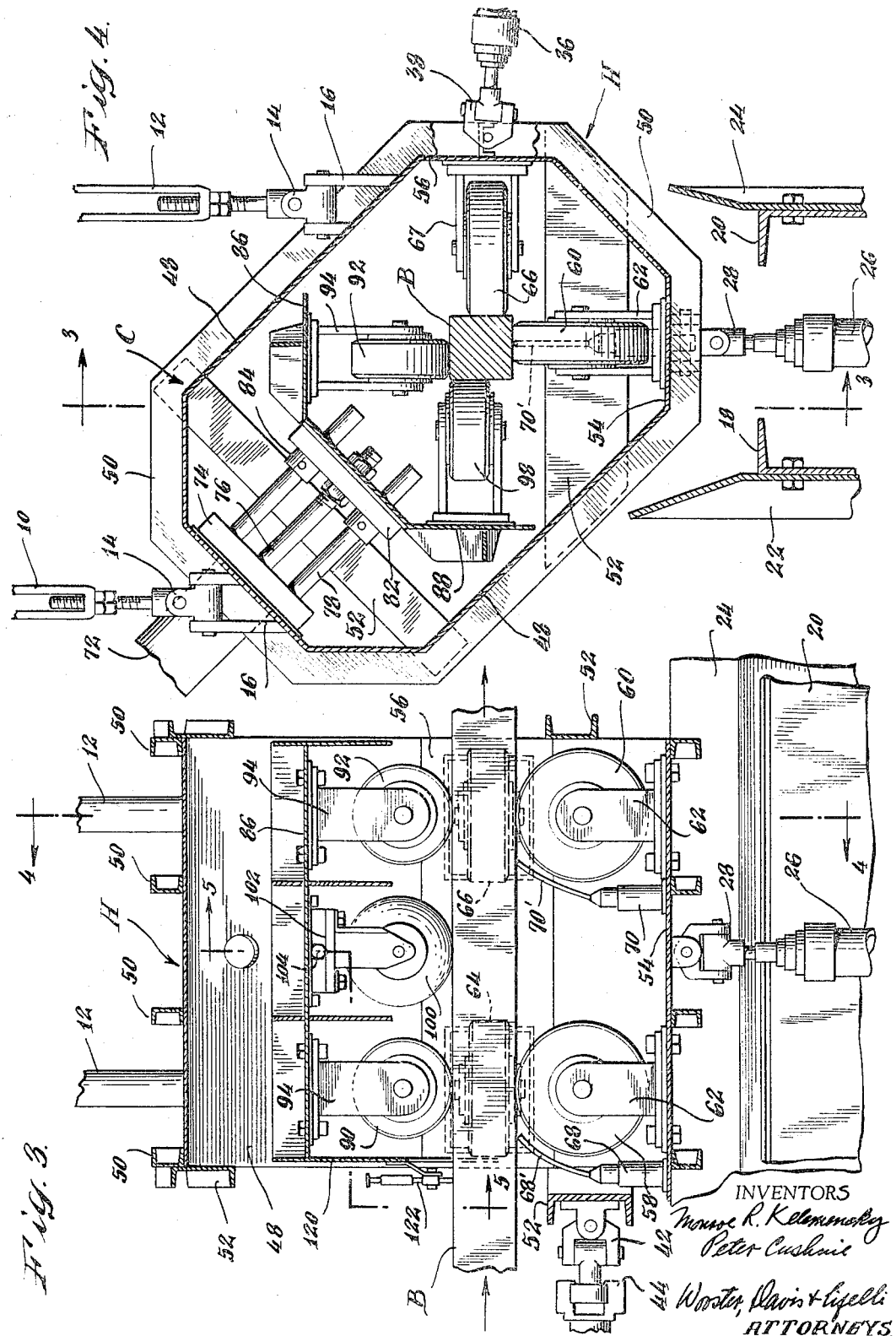

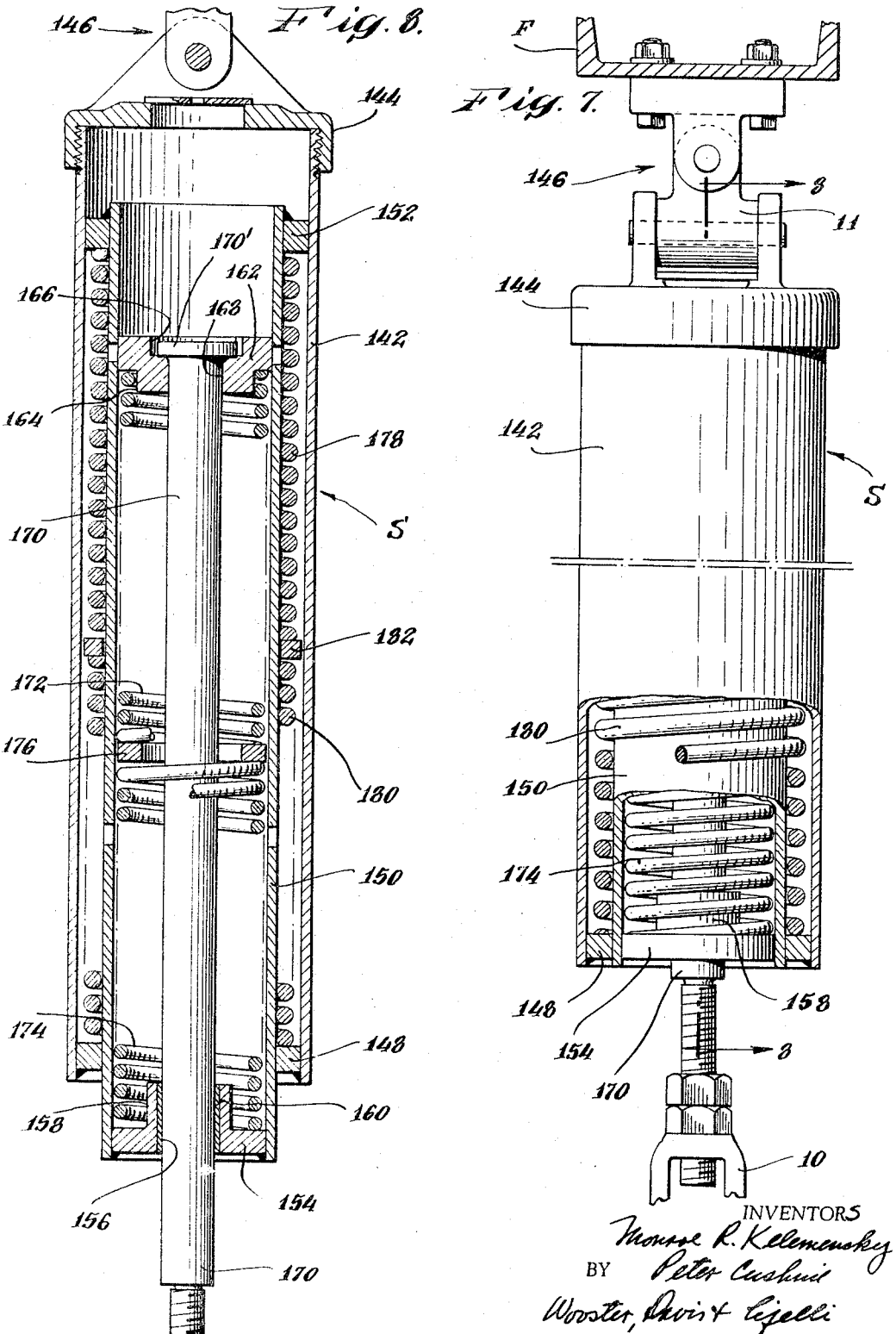

3,327,523
INSPECTION DEVICE FOR ELONGATED OBJECTS
Monroe Robert Kelemencky, Woodbury, and Peter Cushnie, Bethel, Conn., assignors to Automation Industries, Inc., El Segundo, Calif., a corporation of California
Filed Aug. 24, 1964, Ser. No. 391,658
11 Claims. (Cl. 73—71.5)

This invention relates to an inspection device and, more particularly, to a floating tester particularly adapted for the ultrasonic inspection of moving billets.

The customary approach to the automatic inspection of moving test objects is to stabilize the object while moving it relative to a fixed inspection station. Alternatively, the forward motion of the object may be stopped and the inspection apparatus moved along its surface. Both approaches present problems. The latter because it tends to slow an automated production line and the former because it is quite difficult to stabilize large rapidly moving test objects, particularly where a certain amount of bow or twist in the object may be anticipated. For example, ultrasonic inspection is widely used for the inspection of steel billets to determine the presence of interior defects. These billets are customarily moved along a conveyor at speeds which may average 30 feet per minute. Furthermore, these billets are relatively large. One application of the present invention, for example, being the testing of billets four inches square and 40 feet in length.

Ultrasonic testing is normally accomplished by moving an ultrasonic transducer along the surface of the object to be tested. Pulses of ultrasonic energy are directed into the test object. Internal defects reflect a portion of this ultrasonic energy back to the transducer where it is converted to electrical signals and caused to operate suitable display or alarm equipment. The ultrasonic energy must be coupled into the test object by means of a suitable coupling liquid. One method of accomplishing this is to utilize a wheel search unit which comprises a liquid filled resilient tire whch rolls along the surface of the test object. The ultrasonic transducer is enclosed within the wheel and the ultrasonic energy is directed through the enclosed liquid and the tire and into the test object through a film of suitable liquid couplant which is applied to its surface.

The positioning of the wheel search unit against the surface of the test object is of extreme importance. Not only must the coupling between the wheel and the object be maintained, but the wheel must be accurately positioned relative to the cross section of the object so that inspection of the desired portion may be continuously maintained. The difficulty of applying ultrasonic inspection testing to a heavy, rapidly moving test object such as a steel billet will be readily apparent. Still another problem arises from the fact that the ends of steel billets are often rough and are apt to cause damage to wheel search units which bear against them. Accordingly, it is the primary object of this invention to provide an improved device for testing moving bodies. Other objects are provided such a testing device which is arranged to follow the bow and twist in a moving test body; wherein the wheel search unit is accurately positioned throughout the testing period; and wherein ultrasonic coupling between the wheel search unit and the test body is continuously maintained. Other objects, features, and advantages of this invention will be apparent from the following description, the appended claims and the figures of the attached drawings, wherein:

FIG. 1 is a front elevational view of the device of this invention looking in a direction toward an advancing test billet;

FIG. 2 is a left elevational view of the device of FIG. 1;

FIG. 3 is a cross sectional view of the housing portion of the device of FIGS. 1 and 2 taken along the line 3—3 of FIG. 4;

FIG. 4 is a cross section taken along the line 4—4 of FIG. 3;

FIG. 7 is an elevational view of one of the spring nests utilized with this invention; and FIG. 8 in a cross section taken along the line 8—8 of FIG. 7 showing the nest partally extended.

Figure 5:
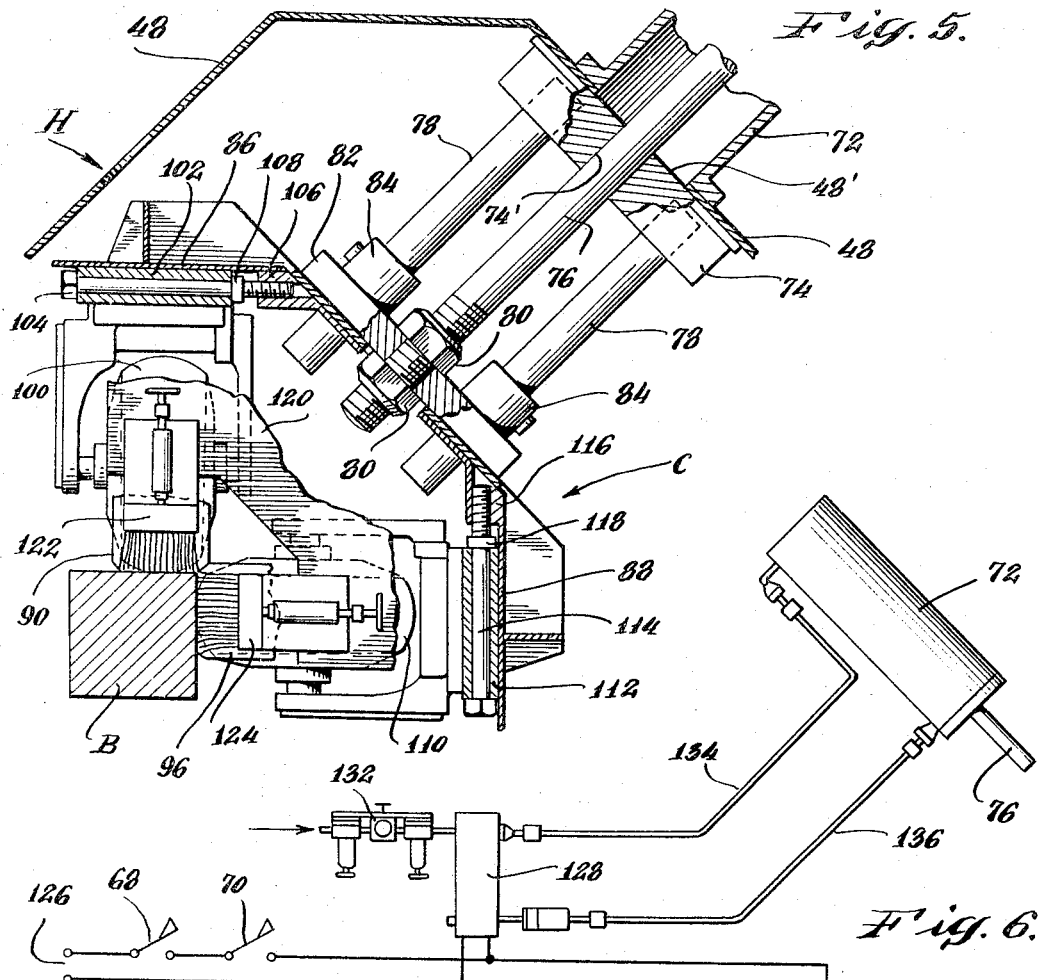
FIG. 5 is an enlarged cross section taken along the line 5—5 of FIG. 3.

The objects of the present invention are achieved by providing a floating housing including the necessary wheel search unit and arranged to clamp onto a moving billet. As the billet advances, the position of the housing changes to follow the bow and twist in the billet.

An approach somewhat similar to the above has been proposed in U.S. Patent 3,121,325 which issued Feb. 18, 1964, to A. B. C. Rankin et al. However, the device disclosed therein is for use with relatively lightweight bars or tubes and relies solely on swing-loaded concave rollers to grip the test object. In addition, the Rankin device does not utilize contact testing but employs "gap scanning" which permits a certain amount of variation in distance between the transducer and the test object.

With particular reference to FIGS. 1 and 2, there is illustrated a housing H suspended within a framework F by means of four identical spring nests S hung from universal mountings 11. The framework F is mounted between the ends of two conveyors C1, C2, so that a billet B under test will pass from one conveyor to the other through the housing H.

The housing H is of eight-sided open-ended construction and is suspended from the spring nests S by means of turnbuckles 10, 12. The lower end of each turnbuckle is secured to the housing H by means of a universal mounting 14 and a bracket 16 mounted on the housing. A pair of horizontally opposed channels 18, 20 form a part of the structure of conveyors C1, C2. Secured to channel 18 is an upright support member 22 arranged to engage one side of the housing H. Another upright support member 24 is connected to channel 20 to engage another side of housing H. Normally, the housing H would float free of the support members 22, 24 because of the action of spring nests S. However, three retracting air cylinders are connected between the housing H and the frame F to cause the housing to seat in the support members 22, 24 as shown in FIG. 1. A lower retracting cylinder 26 is connected to housing H by means of universal mounting 28. The lower end of the retracting cylinder 26 is also secured to a universal mounting 30 which, in turn, is connected to the frame F by means of a bracket comprising the depending side members 32 and a cross member 34. The two side retracting cylinders 36 are similarly connected to the housing H by means of universal mountings 38 and to the side of frame F by universal mountings 40. That side of the housing H which faces the incoming billet is provided with still another universal mounting 42 which is connected through a thrust bearing 44 and a second universal mounting 43 to a support bracket 46 mounted between the channels 18, 20.

The actual construction of the housing is best illustrated in FIGS. 3 and 4. As will be seen by reference to these figures, the housing is open ended, eight sided and somewhat elongated in cross section. The housing has a sheet metal interior wall 48 which is suitably strengthened and supported by encircling channels 50 and cross bracing channels 52. The housing is so aligned that the inside wall 48 forms a horizontal floor 54 and a left side wall 56. The terms "left" and "right" as used herein refer to those directions as seen from an advancing billet.

A pair of lower caster wheels 58, 60 are mounted in similar brackets 62 in spaced aligned relationship along the floor 54 to support a billet B. It will be noted that both of wheels 58, 60 are arranged to bear directly against the lower flat surface of a square billet as shown in FIG. 4. In addition, they are placed in such a manner that wheel 58 is near the front end of the housing and wheel 60 is at the rear end. A front left caster wheel 64 and a rear left caster wheel 66 are positioned in brackets 67 so as to bear against the left side of billet B as shown in FIG. 4. The spacing of wheels 64, 66 is similar to that of wheels 58, 60 as will be apparent from FIG. 3. Positioned adjacent and just to the front of the front lower caster wheel 58 is a front flag switch 68 which is actuated by depression of the upstanding plastic flag 68' by an advancing billet. A rear flag switch 70 is mounted just forward of the rear lower caster wheel 60 and is similarly provided with a flag 70' for actuation by the billet B.

Mounted against the sloping upper wall of the housing H and intermediate the brackets 16 secured to turnbuckles 10 is a gripping air cylinder 72. The cylinder 72 is connected by suitable bolts (not shown) to an internally mounted mounting block 74, as will be seen most clearly in FIG. 5. An opening 48' in wall 48 corresponding to the inner dimensions of the cylinder 72 permits entry of the piston rod 76 to the interior of the housing H. The piston rod 76 is positioned to slide in close fitting relationship within an opening 74' in the mounting block 74. Mounted in mounting block 74 and extending inwardly of housing H are four parallel guide posts 78 which are mounted at the corners of a rectangle surrounding the centrally located piston rod 76. The end of piston rod 76 is threaded and carries a pair of spaced nuts 80 which support a gripping carriage C. The gripping carriage C includes a bearing plate 82 to which are secured four sleeve bearings 84 arranged to slide along the respective guide posts 78.

The carriage C further includes a horizontally extending upper shelf 86 and a vertically depending side shelf 88. Positioned on the upper shelf 86 and depending downwardly therefrom are a pair of spaced gripping wheels, a front top gripping wheel 90 and a rear top gripping wheel 92. Wheels 90 and 92 are mounted in similar brackets 94 so as to engage the upper surface of the billet B opposite the corresponding caster wheels 58, 60. A front side gripping wheel and a rear side gripping wheel 98 are similarly mounted on the side shelf 88 to engage the sides of billet B opposite the front left caster wheel 64 and the rear left caster wheel 66. Mounted on the upper shelf 86 and intermediate the front and rear upper gripping wheels 90, 92 is an upper ultrasonic wheel search unit which comprises a conventional liquid-filled rubber tire 100 supported on an adjustable bracket 102 which is arranged to slide along the upper shelf 86. An adjustment bolt 104 passes through the bracket 102 into threaded engagement with a boss 106. An internal clamping nut 108 permits the bolt 104 and the bracket 102 to be moved inwardly and outwardly as a unit to cause the tire 100 to be transversely positioned at the desired location along the upper surface of billet B. As the search unit is of standard construction, the internally mounted ultrasonic transducers and corresponding circuitry are not shown. It will be understood, however, that the ultrasonic beam from the tire 100 will pass downwardly into the billet B. A side ultrasonic wheel search unit is also provided on the side shelf 88 in a similar fashion between the side gripping wheels 96 and 98. This unit includes a tire 110 mounted on bracket 112 which is slidably secured against the side shelf 88 by means of adjusting bolt 114 which threadedly engages boss 116 and includes a similar clamping nut 118.

In addition to the above structure, the carriage C also includes a front wall 120 to which are secured an upper fountain brush 122 and a side fountain brush 124. Suitable piping is provided to each brush to provide an appropriate coupling liquid, such as water, to the surface of a billet to improve the ultrasonic coupling between each of the search unit wheels and the billet. The piping is not illustrated in order to simplify the presentation.

In order to simplify the illustrations and make them more readily understandable, FIGS. 1–5 have not illustrated the electrical circuitry of switches 68, 70, nor the necessary air piping to cylinders 26, 36, and 72. These features are illustrated schematically in FIG. 6. It will be seen that switches 68, 70 are in series with one another and supply power from a power source 126 which may be, for example, a standard 115 volt 60 cycle source, to a gripping solenoid valve 128 and a retracting solenoid valve 130. Valve 128 receives pressurized air through a regulator 132 and supplies it alternatively through line 134 or line 136 to either side of the double-acting gripping cylinder 72. When the solenoid is deenergized, air pressure is maintained on line 136 so that the piston rod 76 of cylinder 72 is retracted. The solenoid valve 130 supplies pressurized air from supply 138 through separate pressure regulators 140 to each of the cylinders 26, 36. When either of switches 68, 70 is open, valve 130 is also open, so that pressurized air is supplied to each of cylinders 26, 36, causing their respective pistons to be retracted.

The four spring nests which support the housing of this invention are identical and their construction is clearly illustrated in FIGS. 7 and 8. Each nest comprises an outer cylinder 142 which is threaded into a supporting cap 144. The cap in turn is supported by the framework F through a universal mounting 146. Secured to the inner surface and at the lower end of the outer cylinder 142 is an annular flange 148. An inner cylinder 150 which is concentric with the cylinder 142 is mounted therein so as to be slidable within the flange 148. At the upper end of the cylinder 150 and around its outer surface there is secured a second annular flange 152 which is arranged to slide within the outer cylinder 142. The lower end of the inner cylinder 150 is closed by an inner cap 154 which includes an opening 156. The opening is formed through a raised boss 158 and includes a bearing sleeve 160. An inner piston disk 162 is arranged to slide within the inner cylinder 150. Disk 162 is cut away so as to form an annular groove 164 adjacent the inner surface of the wall of cylinder 150. The upper surface of the disk 162 includes a circular recess 166 communicating with a central opening 168. A central rod 170 extends through the opening 156 at the bottom of this nest and through the opening 168 at the top of the nest and terminates at its upper end in an expanded head 170' which seats within the recess 166. Seated within the groove 164 of the piston disk 162 and adjacent the inner surface of the inner cylinder 150 is a first compression spring 172. A second spring 174 is positioned around the boss 158 and extends upwardly within the lower end of the inner cylinder 150. The springs 172, 174 are separated by a washer-like spacer 176 which fits loosely within the inner cylinder 150. Between the inner cylinder 150 and the outer cylinder 142 there are also positioned a third spring 178 and a fourth spring 180. The third spring abuts against the annular flange 152 and the fourth spring against the annular flange 148. These springs are also separated by a washer-like spacer 182 which is movable in the space between the inner and outer cylinders. All four of the springs are of the compression type. The lower end of the piston rod 170 is threaded to engage the proper turnbuckle.

In the illustration of FIG. 7, the spring nest is shown in its non-extended position and is partially cut away. In this position it will be noted that the inner and outer cylinders are in substantial alignment and that the piston rod 170 is withdrawn into the cylinder 150. The operation of the nest under load is illustrated in FIG. 8. As the rod 170 is pulled downward under the influence of an external load, the expanded head 170′ forces the piston disk downwardly within the inner cylinder 150. The piston disk moves against the force of the first spring 172 which begins to compress and transmit the additional force through the spacer 176 to the second spring 174. This spring also begins to compress and exerts additional force against the inner cap 154 which is fixed to the inner cylinder 150. Accordingly, inner cylinder 150 moves downward relative to the outer cylinder 142. The annular flange 152 at the top of the inner cylinder is thus caused to compress the third spring 178, which transmits force through the spacer 182 to the fourth spring 180 which is compressed against the annular flange 148. As the annular flange 148, the outer cylinder 142 and the cap 144 are connected directly to the framework F through the universal mounting 146, the force is transmitted directly to the framework. It will thus be seen that the spring nests of this invention each comprise four springs in series. However, they are nested in such a manner that their overall length is cut to approximately one-half, while not reducing their freedom of movement or energy absorption capability.

Figure 6:
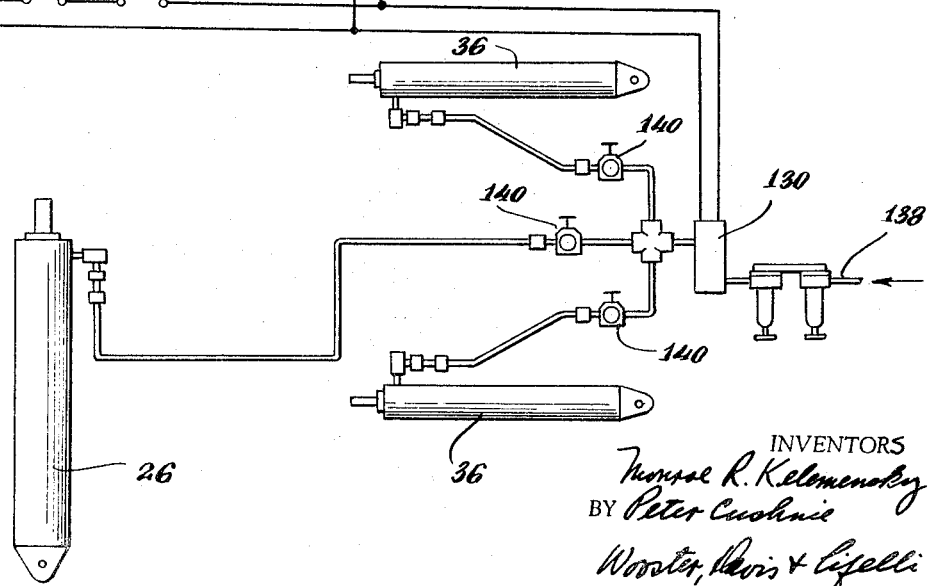
FIG. 6 is a partially schematic illustration of the piping and wiring for the device of the invention.

The operation of this invention may be best understood by referring first to FIG. 1 and to the schematic diagram of FIG. 6. FIG. 1 illustrates the position of the housing H prior to the entry of a billet to be tested. Accordingly, the switches 68, 70 are open so that the solenoid valve 130 is applying air pressure to the lower retracting cylinder 26 and the side retracting cylinders 36. In addition, air is being supplied by solenoid valve 128 through line 136, causing the gripping air cylinder 72 to be retracted. From FIG. 1 it will be noted that retraction of the cylinders 26, 36 pulls the housing H downwardly and to the right relative to its normally suspended position, causing it to seat against the support members 22, 24. In this position it will be noted that the lower caster wheels 58, 60 and the left caster wheels 64, 66 are positioned slightly out of alignment with the oncoming billet B so that it is free to move rapidly into position within the housing.

Before the front end of the billet B advances into the housing it first strikes the upstanding flag 68′ of switch 68 closing the switch and then strikes the flag 70′ of switch 70. As switch 70 closes, it will be noted from FIG. 3 that the end of the billet B will be fully positioned within the housing. At this point, both the solenoid valve 128 and valve 130 are energized. Energization of the solenoid 130 causes this valve to close, thereby releasing air pressure from each of the retracting cylinders 26, 36. As air pressure releases, the normal upward forces of the spring nests S lift the housing H away from the support frames 22, 24, as illustrated in FIG. 4 and cause wheels 60, 66 to engage the adjacent sides of the square billet B.

Actuation of the solenoid valve 128 releases air pressure from line 136 and applies it to line 134, thereby advancing the piston rod 76 of the double-acting gripping air cylinder 72. As piston 76 moves inwardly of the housing H, it carries with it the gripping carriage C which advances inwardly against the billet B until the upper gripping wheels 90, 92 and the side gripping wheels 96, 98 engage the upper and right surfaces of the billet B, thereby clamping tightly onto the billet, as shown in FIG. 4. As the ultrasonic wheel search units are integrally mounted on the gripping carriage C and between the upper and side gripping wheels, the two search units also engage the upper and right side of the billet, as shown in FIG. 5. Coupling fluid is flowed onto the surface of the billet B through the upper fountain brush 122 and the side fountain brush 124 and, as billet B continues to advance through the housing, the ultrasonic test is conducted in the usual fashion.

Prior to entering the housing H, the back end of billet B first releases flag 68′, allowing switch 68 to open. This breaks the circuit of FIG. 6, causing the carriage C to retract and the housing to once again seat against members 22, 24, as shown in FIG. 1.

Whereas most prior art ultrasonic tests have been concerned with maintaining the test object in a static condition or in a stable moving position, it will be noted that the present approach is different. In this arrangement, the housing H clamps securely against opposite corners of the moving billet. By means of the various universal mountings and the flexibility of the spring nests S, the housing H is suspended so as to be free to rotate about at least three mutually perpendicular space axes. Accordingly, the housing will twist and track any variations in the billet B while maintaining the ultrasonic search units in proper alignment therewith. The front of the housing is secured by means of the thrust bearing 44 and the double universal mounting 42, 43 to the bracket 46 which prevents any tendency of the housing to travel linearly with the billet but allows vertical movement of the housing. The problem which the present invention overcomes is particularly difficult, because it involves the use of contact ultrasonic testing. By "contact" we mean the direct contact between the object to be tested and a solid material for transmitting the ulrasonic waves. In the present invention, for example, the solid object is the resilient tire 100 of the ultrasonic search wheel search unit. However, it will be apparent that the solid object could also be a transducer of the usual contact type or some type of solid ultrasonic delay line material. In any event, it will be noted that the present invention does not require the use of bubblers or similar means for providing a variable ultrasonic path, because of the positive, secure gripping action of the housing on the test object combined with the extreme maneuverability of the housing.

It is also to be noted that the billet is clamped and released inwardly of its ends so that the search unit is not subject to damage by contact with the surfaces at these locations.

It will be apparent to those skilled in the art that a number of variations and modifications may be made in this invention without departing from its spirit and scope. Accordingly, it is to be understood that the foregoing description is illustrative only, rather than limiting. This invention is limited only by the scope of the following claims.

What we claim as new and desire to secure by Letters Patent of the United States is:

1. Apparatus for substantially continuous inspection of an elongated test object moving parallel to its longitudinal axis which comprises: a housing open at its opposite ends to receive said test object therethrough; support means connected to support said housing for rotation about three mutually perpendicular space axes; positioning means connected to hold said housing in fixed receiving relationship to the advancing end of a test object; releasing means connected to automatically release said positioning means and housing when the advancing end of said test object has entered said housing; gripping means mounted in said housing for selective engagement with a test object moving therethrough; and testing means mounted on said housing for selective engagement with said test object during its movement through said housing.

2. The apparatus of claim 1 wherein said testing means comprises an ultrasonic wheel search unit.

3. The apparatus of claim 1 wherein said gripping means comprises: first roller means rotatably fixedly secured to said housing; second roller means movably secured to said housing for advancement against said object along a line of direction perpendicular to said longitudinal axis; and advancing means for advancing said second roller means.

4. The apparatus of claim 3 wherein said advancing means is an air cylinder.

5. The apparatus of claim 3 wherein said first roller means comprises at least first and second wheels positioned to contact first and second adjacent sides of said test object and wherein said second roller means comprises at least third and fourth wheels positioned to contact third and fourth adjacent sides of said test object.

6. The apparatus of claim 3 wherein said advancing means comprises switch means positioned within said housing for actuation by the advancing end of said test object and a fluid cylinder operated thereby.

7. An inspection unit for substantially continuous inspection of an elongated multi-sided test object moving parallel to its longitudinal axis which comprises: a framework; a housing open at its opposite ends to receive said object therethrough; a plurality of spring means supporting said housing within said framework; support means positioned to stabilize said housing in a receiving position to said test object; retracting means connected between said framework and said housing to seat said housing in said support means prior to entry of said test object; first roller means mounted in said housing to contact a first side of said test object; second roller means mounted in said housing to contact a second side of said test object; movable carriage means mounted in said housing for advancement toward and away from said first and second roller means and including third roller means and a first ultrasonic search unit, both positioned to contact a third side of said test object, fourth roller means and a second ultrasonic search unit, both positioned to contact a fourth side of said test object; piston and cylinder means for advancing said carriage means; and switch means mounted in said housing for actuation by entry of said test object therein and connected to substantially simultaneously activate said piston and cylinder means and release said retracting means.

8. The unit of claim 7 wherein said cylinder means and retracting means are solenoid-operated air cylinders.

9. The unit of claim 8 wherein said housing is connected to each of said springs and retracting means by universal mountings.

10. The unit of claim 9 wherein thrust bearing means is connected between said housing and said framework to limit movement of said housing in the direction of movement of said test object.

11. The unit of claim 10 wherein each of said spring means comprises: an outer hollow cylinder having a first end arranged for connection to said framework and a first annular flange within its second end; an inner hollow cylinder concentric with and spaced from said first cylinder to telescopically slide therein, said inner cylinder having a first end and a second end adjacent the corresponding ends of said outer cylinder when said spring means is in its non-extended position, the first end of said inner cylinder having a second annular flange thereon in sliding relationship with said outer cylinder, the second end of said inner cylinder having a third annular flange therein; first compression coil spring means mounted between said cylinders and against said first and second annular flanges; piston means slidably positioned within said inner cylinder; second compression coil spring means mounted within said inner cylinder and between said piston means and said third annular flange; and rod means having a first end secured to said piston means and a second end extending outwardly of said inner cylinder at its second end for connection to said housing.

References Cited
UNITED STATES PATENTS

| | | | |
|---|---|---|---|
| 3,121,325 | 2/1964 | Rankin et al. | 73—67.7 |
| 3,183,709 | 5/1965 | Rankin et al. | 73—67.5 |

FOREIGN PATENTS

| | | |
|---|---|---|
| 1,060,626 | 7/1959 | Germany. |

JAMES J. GILL, *Acting Primary Examiner.*